(12) United States Patent
Hiraoka (10) Patent No.: US 9,428,665 B2
(45) Date of Patent: Aug. 30, 2016

(54) PHOTOPOLYMERIZABLE INKJET INK, INK CARTRIDGE, AND INKJET RECORDING DEVICE

(75) Inventor: Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/117,236

(22) PCT Filed: May 10, 2012

(86) PCT No.: PCT/JP2012/062568
§ 371 (c)(1),
(2), (4) Date: Nov. 12, 2013

(87) PCT Pub. No.: WO2012/153867
PCT Pub. Date: Nov. 15, 2012

(65) Prior Publication Data
US 2014/0327719 A1 Nov. 6, 2014

(30) Foreign Application Priority Data

May 12, 2011 (JP) .................. 2011-107318
Nov. 1, 2011 (JP) .................. 2011-240605

(51) Int. Cl.
| | |
|---|---|
| *B41J 2/15* | (2006.01) |
| *C09D 133/10* | (2006.01) |
| *B41J 2/155* | (2006.01) |
| *C09D 11/101* | (2014.01) |
| *C09D 11/30* | (2014.01) |

(Continued)

(52) U.S. Cl.
CPC .............. *C09D 133/10* (2013.01); *B41J 2/14* (2013.01); *B41J 2/155* (2013.01); *B41J 2/17503* (2013.01); *C09D 11/101* (2013.01); *C09D 11/30* (2013.01); *C09D 129/10* (2013.01)

(58) Field of Classification Search
CPC .. B41J 2/2107; C09D 11/322; C09D 11/101; C09D 11/38; C09D 11/30; C09D 11/40
See application file for complete search history.

(56) References Cited

U.S. PATENT DOCUMENTS

| 2004/0145639 A1 | 7/2004 | Noutary |
| 2005/0173680 A1* | 8/2005 | Yang ............................. 252/500 |

(Continued)

FOREIGN PATENT DOCUMENTS

| CN | 1690136 A | 11/2005 |
| CN | 101068892 A | 11/2007 |

(Continued)

OTHER PUBLICATIONS

International Search Report Issued for counterpart International Patent Application No. PCT/JP2012/062568 dated Jun. 26, 2012.

(Continued)

*Primary Examiner* — Lamson Nguyen
(74) *Attorney, Agent, or Firm* — Oblon, McClelland, Maier & Neustadt, L.L.P (57) ABSTRACT

A photopolymerizable inkjet ink including: at least one selected from the group consisting of (meth)acrylic acid esters negative for skin sensitization and (meth)acrylamides negative for skin sensitization; and at least one selected from the group consisting of vinyl ethers negative for skin sensitization, t-butyl methacrylate negative for skin sensitization, n-pentyl methacrylate negative for skin sensitization, and n-hexyl methacrylate negative for skin sensitization.

14 Claims, 2 Drawing Sheets

(51) Int. Cl.
*B41J 2/14* (2006.01)
*B41J 2/175* (2006.01)
*C09D 129/10* (2006.01)

(56) References Cited

U.S. PATENT DOCUMENTS

| | | |
|---|---|---|
| 2006/0098064 A1 | 5/2006 | Noutary |
| 2007/0115327 A1 | 5/2007 | Nakamura |
| 2007/0206053 A1 | 9/2007 | Kasai |
| 2008/0160209 A1 | 7/2008 | Takabayashi |
| 2008/0316244 A1 | 12/2008 | Lugassi et al. |
| 2009/0000508 A1 | 1/2009 | Edison et al. |
| 2009/0278904 A1 | 11/2009 | Oh et al. |
| 2010/0029813 A1 | 2/2010 | Deroover et al. |
| 2010/0068407 A1 | 3/2010 | Jeremic |
| 2012/0086762 A1 | 4/2012 | Noguchi et al. |
| 2012/0200648 A1 | 8/2012 | Hiraoka et al. |
| 2013/0321539 A1 | 12/2013 | Hiraoka |

FOREIGN PATENT DOCUMENTS

| | | |
|---|---|---|
| CN | 101228240 A | 7/2008 |
| CN | 101522828 A | 9/2009 |
| EP | 1 803 555 A1 | 7/2007 |
| EP | 1 840 176 A1 | 10/2007 |
| EP | 1 964 893 A1 | 9/2008 |
| EP | 2 223 977 A1 | 9/2010 |
| JP | 2003-192943 | 7/2003 |
| JP | 2003-192944 | 7/2003 |
| JP | 2004-526820 | 9/2004 |
| JP | 3672651 | 4/2005 |
| JP | 2005-162882 | 6/2005 |
| JP | 2005-532445 | 10/2005 |
| JP | 2007-138118 | 6/2007 |
| JP | 2007-231230 | 9/2007 |
| JP | 2007-231232 | 9/2007 |
| JP | 2007-297516 | 11/2007 |
| JP | 2007-308649 | 11/2007 |
| JP | 2008-068516 | 3/2008 |
| JP | 2008-507598 | 3/2008 |
| JP | 2009-062541 | 3/2009 |
| JP | 2009-197194 | 9/2009 |
| JP | 2009-272609 | 11/2009 |
| JP | 2010-509426 | 3/2010 |
| JP | 2010-530922 | 9/2010 |
| JP | 2012-162653 | 8/2012 |
| KR | 10-2009-0008281 | 1/2009 |
| WO | WO 2008/139188 A1 | 11/2008 |

OTHER PUBLICATIONS

Combined Chinese Office Action and Search Report issued May 5, 2014 in Patent Application No. 201280023019.7 with English Translation.

Office Action issued Apr. 17, 2015, in Korean Patent Application No. 10-2013-7030876 filed Nov. 21, 2013 w/English translation.

Office Action issued Apr. 28, 2015, in Japanese Patent Application No. 2011-240605 filed Nov. 1, 2011.

Supplementary European Search Report issued Jul. 23, 2015 in European Patent Application No. 12782483, filed May 10, 2012.

Office Action issued Apr. 16, 2015 in Chinese Patent Application No. 201280023019.7, filed May 10, 2012 w/English translation.

\* cited by examiner

PHOTOPOLYMERIZABLE INKJET INK, INK CARTRIDGE, AND INKJET RECORDING DEVICE

TECHNICAL FIELD

The present invention relates to a photopolymerizable inkjet ink, an ink cartridge housing the photopolymerizable inkjet ink, and an inkjet recording device containing the ink cartridge mounted thereto.

BACKGROUND ART

There have widely been known photopolymerizable inkjet inks containing (meth)acrylic acid esters, and photopolymerizable inkjet inks containing (meth)acrylic acid esters and vinyl ethers in combination (see, for example, PTL 1).

However, many of the monomers used in such conventional photopolymerizable inkjet inks have toxicity. Although (meth)acrylic acid esters are inexpensive and easily procurable, most of them exhibit high skin sensitization, which is a property of causing allergy on the skin brought into contact with them. Conventional art has not shown any solution to this problem.

The present inventors previously conducted studies on this problem and found some (meth)acrylic acid esters and (meth)acrylamides negative for skin sensitization. However, in an attempt to produce an ink with a practical level of curing property from these compounds, the resultant ink disadvantageously becomes more viscous than commonly used inkjet inks. Thus, an ejection head able to be heated to a high temperature sufficient to reduce the viscosity of the ink must be used to inkjet the ink. In addition, the inner pressure of the head has to be considerably increased to eject the ink, making it hard to eject the ink stably.

CITATION LIST

Patent Literature

PTL 1: Japanese Patent Application Laid-Open (JP-A) No. 2004-526820

SUMMARY OF INVENTION

Technical Problem

An object of the present invention is to provide: a photopolymerizable inkjet ink which involves no skin sensitization and which has low viscosity and improved curing property; an ink cartridge housing the photopolymerizable inkjet ink; and an inkjet recording device containing the ink cartridge mounted thereto.

Solution to Problem

Means for solving the problems are as follows. Specifically, a photopolymerizable inkjet ink of the present invention includes: at least one selected from the group consisting of (meth)acrylic acid ester negative for skin sensitization and (meth)acrylamide negative for skin sensitization; and at least one selected from the group consisting of vinyl ether negative for skin sensitization, t-butyl methacrylate negative for skin sensitization, n-pentyl methacrylate negative for skin sensitization, and n-hexyl methacrylate negative for skin sensitization.

Advantageous Effects of Invention

The present invention can provide: a photopolymerizable inkjet ink which involves no skin sensitization and which has low viscosity and improved curing property; an ink cartridge housing the photopolymerizable inkjet ink; and an inkjet recording device containing the ink cartridge mounted thereto.

DESCRIPTION OF EMBODIMENTS (Photopolymerizable Inkjet Ink)

A photopolymerizable inkjet ink of the present invention includes: at least one selected from the group consisting of (meth)acrylic acid esters negative for skin sensitization and (meth)acrylamides negative for skin sensitization; and at least one selected from the group consisting of vinyl ethers negative for skin sensitization, t-butyl methacrylate negative for skin sensitization, n-pentyl methacrylate negative for skin sensitization, and n-hexyl methacrylate negative for skin sensitization. The photopolymerizable inkjet ink of the present invention may include a photoradical polymerization initiator and, if necessary, further includes other ingredients.

There have not yet been identified any materials that can be used for the photopolymerizable inkjet ink (hereinafter may be referred to as "ink"), that is negative for skin sensitization, and that can sufficiently reduce the viscosity of the ink and impart sufficient curing property to the ink when used alone. Then, using combinations of monomers negative for skin sensitization, the present inventors examined favorable balances between a monomer having high viscosity but good curing property and a monomer having insufficient curing property but low viscosity. As a result, they have found vinyl ether, t-butyl methacrylate, n-pentyl methacrylate and n-hexyl methacrylate as photopolymerizable monomers that are sufficiently low in viscosity and negative for skin sensitization, and have succeeded in preparing an ink with low viscosity and improved curing property by combining the above photopolymerizable monomers with (meth)acrylic acid ester negative for skin sensitization and/or (meth)acrylamide negative for skin sensitization, both of which the present inventors previously found.

Here, the photopolymerizable monomer negative for skin sensitization refers to at least one of the following compounds (1) to (3):
(1) a compound having a Stimulation Index (SI value) of less than 3, where the Stimulation Index indicates the extent of sensitization as measured by a skin sensitization test based on the LLNA (Local Lymph Node Assay);
(2) a compound evaluated as "negative for skin sensitization" or "no skin sensitization" in its MSDS (Material Safety Data Sheet); and
(3) a compound evaluated as "negative for skin sensitization" or "without skin sensitization" in literature [e.g., Contact Dermatitis 8 223-235 (1982)].

Regarding the above (1), the compound having a SI value of less than 3 is considered negative for skin sensitization as described in literatures, for example, "Functional Material" (*Kino Zairyou*) 2005, September, Vol. 25, No. 9, p. 55. The lower SI value means lower skin sensitization. Thus, in the present invention, a monomer or an oligomer having lower SI value is preferably used. The SI value of the monomer or the oligomer used is less than 3, preferably 2 or lower, more preferably 1.6 or lower.

<(Meth)Acrylic Acid Ester and (Meth)Acrylamide>

Examples of the (meth)acrylic acid ester or the (meth) acryl amide which is negative for skin sensitization, inexpensive and easily procurable include polyethylene glycol dimethacrylates represented by the following General Formula (1), γ-butyrolactone methacrylate, trimethylolpropane trimethacrylate, tricyclodecanedimethanol dimethacrylate, caprolactone-modified dipentaerythritol hexaacrylate, polypropylene glycol diacrylate [$CH_2$=CH—CO—($OC_3H_6$)$_n$—OCOCH=$CH_2$ (n is 12) where n is an average degree of polymerization], diacrylates of caprolactone-modified neopentylglycol hydroxypivalate, polyethoxylated tetramethylol methane tetraacrylate, ethylene oxide-modified bisphenol A diacrylate, neopentyl glycol dimethacrylate, hydroxyethyl acrylamide and stearyl acrylate. These may be used alone or in combination.

(1)

In General Formula (1), n is an integer of 9 to 14 where n is an average degree of polymerization.

The amount of the at least one of the (meth)acrylic acid ester negative for skin sensitization and the (meth)acryl amide negative for skin sensitization is preferably 10% by mass to 90% by mass, more preferably 40% by mass to 60% by mass, relative to the total amount of monomers.

When the amount thereof is excessively small, photocuring reaction does not proceed satisfactorily. As a result, there may be degradation in fast-drying performance and strength of a coated film which are advantageous features of photopolymerizable inks. Whereas when the amount thereof is excessively large, various materials other than these monomers are incorporated in only small amounts. In particular, limitation is imposed on the amounts of a colorant and a polymerization initiator which are important materials. In that case, it becomes difficult to both form a coated film having a hue with a sufficiently high density and obtain fast-drying performance and strength of a coated film which are advantageous features of photopolymerizable inks. However, this is not true of the case of forming a colorless film or a light-colored film requiring only a small amount of a colorant and of using electron beams as a light source with which polymerization reaction can proceed without polymerization initiator.

Notably, other (meth)acrylates, (meth)acryl amides and vinyl ethers, which somewhat sensitize the skin when used alone or which have not been confirmed for skin sensitization, would be used in combination so long as the amount of them falls within such a range that does not raise any problems as inks. Specifically, the following are exemplified: ethylene glycol di(meth)acrylate, neopentylglycol hydroxypivalate di(meth)acrylate, γ-butyrolactone acrylate, isobornyl(meth)acrylate, formalized trimethylolpropane mono(meth)acrylate, polytetramethylene glycol di(meth) acrylate, trimethylolpropane(meth)acrylate benzoate, diethylene glycol di(meth)acrylate, triethylene glycol di(meth) acrylate, tetraethylene glycol di(meth)acrylate, polyethylene glycol diacrylates [$CH_2$=CH—CO—($OC_2H_4$)$_n$—OCOCH=$CH_2$ where n is 4], [$CH_2$=CH—CO—($OC_2H_4$)$_n$—OCOCH=$CH_2$ where n is 9], [$CH_2$=CH—CO—($OC_2H_4$)$_n$—OCOCH=$CH_2$ where n is 14], and [$CH_2$=CH—CO—($OC_2H_4$)$_n$—OCOCH=$CH_2$ where n is 23], dipropylene glycol di(meth)acrylate, tripropylene glycol di(meth)acrylate, polypropylene glycol dimethacrylate [$CH_2$=C($CH_3$)—CO—($OC_3H_6$)$_n$—OCOC($CH_3$)=$CH_2$ where n is 7)], 1,3-butandiol di(meth)acrylate, 1,4-butandiol diacrylate, 1,6-hexanediol di(meth)acrylate, 1,9-nonanediol di(meth)acrylate, neopentyl glycol diacrylate, tricyclodecanedimethanol diacrylate, propylene oxide-modified bisphenol A di(meth)acrylate, polyethylene glycol di(meth) acrylate, dipentaerythritol hexa(meth)acrylate, (meth) acryloyl morpholine, 2-hydroxypropyl(meth)acrylamide, propylene oxide-modified tetramethylolmethane tetra(meth) acrylate, dipentaerythritol hydroxypenta(meth)acrylate, caprolactone-modified dipentaerythritol hydroxypenta (meth)acrylate, ditrimethylolpropane tetra(meth)acrylate, pentaerythritol tetra(meth)acrylate, trimethylolpropane triacrylate, ethylene oxide-modified trimethylolpropane tri (meth)acrylate, propylene oxide-modified trimethylolpropane tri(meth)acrylate, caprolactone-modified trimethylolpropane tri(meth)acrylate, pentaerythritol tri (meth)acrylate, tris(2-hydroxyethyl)isocyanurate tri(meth) acrylate, neopentyl glycol diacrylate, ethoxylated neopentyl glycol di(meth)acrylate, propylene oxide-modified neopentyl glycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly(meth)acrylate, N-vinylcaprolactam, N-vinylpyrrolidone, N-vinylformamide, polyurethane di(meth)acrylate, polyurethane tri(meth)acrylate, polyurethane tetra(meth)acrylate, polyurethane penta(meth) acrylate, polyurethane poly(meth)acrylate, cyclohexane dimethanol divinyl ether, cyclohexane dimethanol monovinyl ether, hydroxyethyl vinyl ether, diethylene glycol monovinyl ether, diethylene glycol divinyl ether, dicyclopentadiene vinyl ether, tricyclodecane vinyl ether, benzyl vinyl ether and ethyloxetanemethyl vinyl ether. These may be used alone or in combination.

<t-Butyl methacrylate, n-pentyl methacrylate, and n-hexyl methacrylate>

Examples of the vinyl ether negative for skin sensitization include triethylene glycol divinyl ether, hydroxybutyl vinyl ether and ethyl vinyl ether. Among them, triethylene glycol divinyl ether is preferred, since it is sufficiently low in viscosity and has the boiling point as to be easily handled under ordinary temperature and pressure.

As described above, when the at least one of vinyl ether, t-butyl methacrylate, n-pentyl methacrylate and n-hexyl methacrylate having sufficiently low viscosity was used, the obtained ink can be reduced in viscosity and improved in curing property while being negative for skin sensitization as compared with an ink containing none of them.

The amount of the at lease one of vinyl ether negative for skin sensitization, t-butyl methacrylate negative for skin sensitization, n-pentyl methacrylate negative for skin sensitization, and n-hexyl methacrylate negative for skin sensitization is preferably 10% by mass to 90% by mass, more preferably 40% by mass to 60% by mass, relative to the total amount of monomers.

The above monomers all have a sufficiently low viscosity but do not have very high polymerization reactivity. Thus, when the amount thereof is excessively small, it may be difficult for the resultant ink to be lowered in viscosity to such an extent that good ejection performance can be obtained. When the amount thereof is excessively large, photocuring reaction does not proceed satisfactorily, and fast-drying performance which is an advantageous feature of photopolymerizable inks cannot be obtained in some cases.

-Photoradical Polymerization Initiator-

The ink of the present invention preferably contains a photoradical polymerization initiator.

More preferably, the photoradical polymerization initiator used is negative for skin sensitization.

The (meth)acrylic acid ester, the (meth)acryl amide, and the vinyl ether are known to have cationic polymerization property as well. Photocationic polymerization initiators are generally expensive and generate a trace amount of a strong acid even in the state where they are not irradiated with light. Thus, it is necessary to take special cares such as imparting acid resistance to the ink supply channel of a printer, imposing limitation on the choice of the constituent members of the printer. In contrast, the ink of the present invention can contain the photoradical polymerization initiator that is inexpensive and generates no strong acid. Thus, it is possible to produce an ink at low cost, and also it is easy to choice the constituent members of a printer. Needless to say, when using quite high energy light source such as electron beams, $\alpha$ rays, $\beta$ rays, $\gamma$ rays or X rays, polymerization reaction proceeds without polymerization initiator. This is a conventionally known matter, and not described in detail in the present invention.

The photoradical polymerization initiator is, for example, a self-cleaving photopolymerization initiator and a hydrogen-abstracting polymerization initiator.

Examples of the self-cleaving photopolymerization initiator include 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methylpropionyl)benzyl]phenyl}-2-methyl-1-propan-1-one, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1,2-dimethyl amino-2-(4-methylbenzyl)-1-(4-morpholin-4-yl-phenyl)butan-1-one, bis(2,4,6-trimethylbenzoyl)phenylphosphine oxide, bis(2,6-dimethoxybenzolyl)-2,4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime) and [4-(methylphenylthio)phenyl]phenylmethanone. These may be used alone or in combination.

Examples of the hydrogen-abstracting polymerization initiator include: benzophenone compounds such as benzophenone, methylbenzophenone, methyl-2-benzoylbenzoate, 4-benzoyl-4'-methyldiphenyl sulfide and phenylbenzophenone; and thioxanthone compounds such as 2,4-diethylthioxanthone, 2-chlorothioxanthone, isopropylthioxanthone and 1-chloro-4-propylthioxanthone. These may be used alone or in combination.

Also, an amine may additionally be used as a polymerization accelerator, and examples of the amine include ethyl p-dimethylaminobenzoate, 2-ethylhexyl p-dimethylaminobenzoate, methyl p-dimethylaminobenzoate, 2-dimethylaminoethyl benzoate and butoxyethyl p-dimethylaminobenzoate.

The amount of the photoradical polymerization initiator is preferably 1% by mass to 25% by mass relative to the total amount of the ink.

<Other Ingredients>

If necessary, a colorant may be incorporated into the ink. The colorant usable for the ink may be a known inorganic or organic pigment.

As for black pigments, those such as carbon black produced by the furnace method or the channel method can be used.

As for yellow pigments, for example, the following Pig. Yellow series pigments can be used: Pig. Yellow 1, Pig. Yellow 2, Pig. Yellow 3, Pig. Yellow 12, Pig. Yellow 13, Pig. Yellow 14, Pig. Yellow 16, Pig. Yellow 17, Pig. Yellow 73, Pig. Yellow 74, Pig. Yellow 75, Pig. Yellow 83, Pig. Yellow 93, Pig. Yellow 95, Pig. Yellow 97, Pig. Yellow 98, Pig. Yellow 114, Pig. Yellow 120, Pig. Yellow 128, Pig. Yellow 129, Pig. Yellow 138, Pig. Yellow 150, Pig. Yellow 151, Pig. Yellow 154, Pig. Yellow 155, and Pig. Yellow 180.

As for magenta pigments, for example, the following Pig. Red series pigments can be used: Pig. Red 5, Pig. Red 7, Pig. Red 12, Pig. Red 48 (Ca), Pig. Red 48 (Mn), Pig. Red 57 (Ca), Pig. Red 57:1, Pig. Red 112, Pig. Red 122, Pig. Red 123, Pig. Red 168, Pig. Red 184, Pig. Red 202, and Pig. Violet 19.

As for cyan pigments, for example, the following Pig. Blue series pigments can be used: Pig. Blue 1, Pig. Blue 2, Pig. Blue 3, Pig. Blue 15, Pig. Blue 15:3, Pig. Blue 15:4, Pig. Blue 16, Pig. Blue 22, Pig. Blue 60, Vat Blue 4, and Vat Blue 60.

As for white pigments, for example, sulfuric acid salts of alkaline earth metals such as barium sulfate, carbonic acid salts of alkaline earth metals such as calcium carbonate, silica such as fine silicic acid powder and synthetic silicic acid salts, calcium silicate, alumina, alumina hydrate, titanium oxide, zinc oxide, talc and clay.

In addition, various inorganic or organic pigments may optionally be used considering, for example, physical properties of the ink.

The amount of the colorant is preferably 1% by mass to 15% by mass relative to the total amount of the ink.

Furthermore, a polymerization inhibitor, a surfactant or a polar group-containing polymeric pigment dispersing agent may optionally be used. Examples of the polymerization inhibitor include 4-methoxy-1-naphthol, methylhydroquinone, hydroquinone, t-butylhydroquinone, di-t-butylhydroquinone, methoquinone, 2,2'-dihydroxy-3,3'-di($\alpha$-methylcyclohexyl)-5,5'-dimethyldiphenylmethane, p-benzoquinone, di-t-butylbutyl diphenylamine, 9,10-di-n-butoxyanthracene, 4,4'-[1,10-dioxo-1,10-decandiylbis(oxy)]bis[2,2,6,6-tetramethyl]-1-piperidinyloxy. Examples of the surfactant include higher-fatty-acid surfactants, silicone surfactants and fluorosurfactants.

(Ink Cartridge)

An inkjet cartridge of the present invention includes: the above-described photopolymerizable inkjet ink of the present invention; and a container which houses the photopolymerizable inkjet ink. With this form, users do not have to directly touch the ink during works such as exchange of the ink, and thus they are not concerned with staining of their fingers, hands or clothes. In addition, it is possible to prevent interfusion of foreign matter such as dust into the ink.

The container is not particularly limited, and the shape, structure, size and material thereof may be appropriately selected depending on the intended purpose. For example, the container is preferably selected from those having at least an ink bag formed of an aluminum laminate film, or a resin film.

Figure 1:
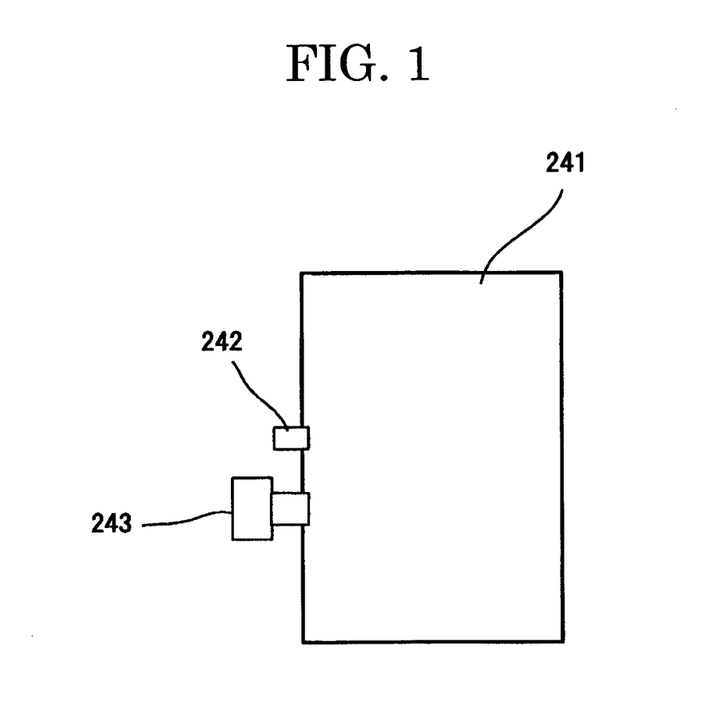
FIG. 1 schematically illustrates one exemplary ink bag of an ink cartridge.
Figure 2:
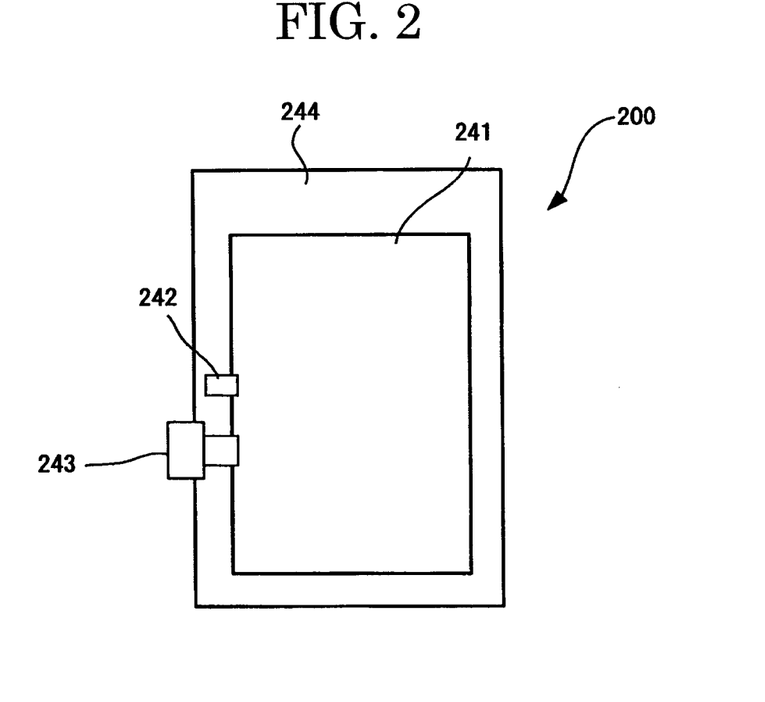
FIG. 2 schematically illustrates an ink cartridge housing an ink bag.

The ink cartridge will be described referring to FIGS. 1 and 2. FIG. 1 schematically illustrates an example of an ink bag 241 of an ink cartridge. FIG. 2 schematically illustrates an ink cartridge 200 containing the ink bag 241 illustrated in FIG. 1 and a cartridge case 244 which houses the ink bag 241.

As illustrated in FIG. 1, the ink bag 241 is filled with the ink by injecting the ink from an ink inlet 242. After removal of air present inside the ink bag 241, the ink inlet 242 is sealed by fusion bonding. At the time of use, a needle attached to the main body of the device is inserted into an ink outlet 243 formed of a rubber member to supply the ink to the device therethrough. The ink bag 241 is formed of a wrapping member such as an air non-permeable aluminum laminate film. As illustrated in FIG. 2, the ink bag 241 is typically housed in a plastic cartridge case 244, which is then detachably mounted in use to various inkjet recording devices as the ink cartridge 200.

The ink cartridge of the present invention is preferably detachably mounted to inkjet recording devices. The ink cartridge can simplify the refill and exchange of the ink to improve workability.

(Inkjet Recording Device)

An inkjet recording device of the present invention includes an ink jetting unit and the above-described ink cartridge of the present invention; and, if necessary, further includes other units such as a control unit.

-Ink Jetting Unit-

The ink jetting unit is a unit configured to apply a stimulus to the ink of the present invention to make the ink jet and thereby form an image. The ink jetting unit is not particularly limited and examples thereof include inkjet heads.

The inkjet heads encompass any of a piezoelectric inkjet head, a thermal inkjet head, and an electrostatic inkjet head. The piezoelectric inkjet head is configured to eject ink droplets by deforming a vibration plate forming the wall surface of an ink flow channel to change the volume inside the ink flow channel, using a piezoelectric element as a pressure generating unit configured to compress the ink within the ink flow channel (see JP-A No. 02-51734). The thermal inkjet head is configured to generate air bubbles by heating an ink within an ink flow channel by using a heat element (see JP-A No. 61-59911). The electrostatic inkjet heat is configured to eject ink droplets by deforming a vibration plate with electrostatic force generated between an electrode and a vibration plate facing the electrode and forming the wall surface of an ink flow channel, to thereby change the volume inside the ink flow channel (see JP-A No. 06-71882).

The stimulus can be generated by, for example, a stimulus generating unit. The stimulus is not particularly limited and may be appropriately selected depending on the intended purpose. Examples thereof include heat (temperature), pressure, vibrations, and light. These may be used alone or in combination. Among them, heat and pressure are preferred.

The stimulus generating unit is, for example, a heating device, a pressure device, a piezoelectric element, a vibration generator, an ultrasonic wave oscillator, and an electric light. Specific examples of the stimulus generating unit include: piezoelectric actuators such as a piezoelectric element; thermal actuators utilizing phase transition resulting from film boiling of liquid caused by using an electric-heat converter such as a heat element; shape memory alloy actuators utilizing phase transition of a metal resulting from change in temperature; and electrostatic actuators utilizing electrostatic force.

The embodiment where the inkjet ink is jetted is not particularly limited and varies depending on the stimulus applied. In the case where the stimulus is "heat," there is a method in which thermal energy corresponding to recording signals is applied to the ink present in a recording head by using, for example, a thermal head, to foam the ink by the thermal energy applied, and the pressure from the resultant foam is utilized to eject droplets of the ink from nozzle openings of the recording head. In the case where the stimulus is "pressure," there is a method in which voltage is applied to a piezoelectric element adhering to a position called a pressure chamber in the ink flow channel within the recording head so as to bend the piezoelectric element, and the reduction in the volume of the pressure chamber caused by the bended piezoelectric element initiates ejection of droplets of the ink from nozzle openings of the recording head.

The control unit is not particularly limited, so long as it can control the operation of each unit, and may be appropriately selected depending on the intended purpose. Examples thereof include devices such as a sequencer and a computer.

Figure 3:
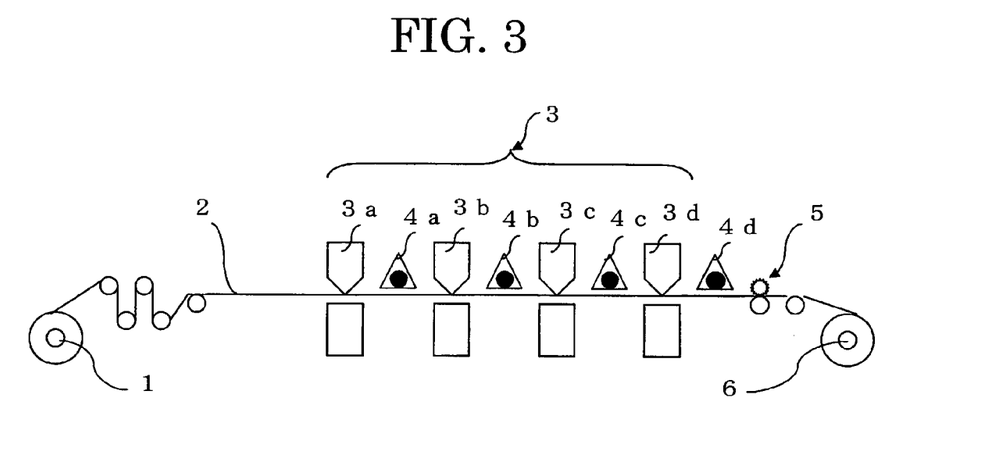
FIG. 3 schematically illustrates one exemplary inkjet recording device.

Here, FIG. 3 schematically illustrates one exemplary inkjet recording device.

The inkjet recording device illustrated in FIG. 3 forms a color image as follows. Specifically, printing units 3 (i.e., printing units 3a, 3b, 3c and 3d for respective colors (e.g., yellow, magenta, cyan and black)) eject color inks (yellow, magenta, cyan and black) on a base material to be printed 2 (which is conveyed from left to right in FIG. 3) fed from a base material feed roller 1, and light (UV rays) is applied from UV light sources (curing light sources) 4a, 4b, 4c and 4d to the corresponding color inks for curing. Each of the printing units 3a, 3b, 3c and 3d has a heating mechanism at an ink ejecting portion thereof, and a cooling mechanism at a base material holding portion thereof (i.e., a portion above or under the base material in FIG. 3). The heating mechanism serves to heat an ink with a high viscosity so as to decrease its viscosity. The cooling mechanism serves to cool the base material to about room temperature in a contact or non-contact manner, if necessary. In the case where the ink is heated for ejection, when the printing area of the previously printed color is small and the conveyance speed of the base material is low, the base material is naturally cooled and kept at about room temperature in the subsequent printing. However, when the printing area of the previously printed color is large and the conveyance speed of the base material is high, the base material increases in temperature to potentially cause variation between the respective color inks in behaviors such as wetting and spreading of the ink droplets that have been jetted onto the base material or the previously jetted ink, to thereby adversely affect image formation. Thus, if necessary, the cooling mechanism may be provided for keeping a base material at about room temperature.

The base material 2 used is, for example, paper, a film, a metal or a composite material thereof. The base material 2 illustrated in FIG. 3 is a roll but may be a sheet.

In addition, the base material may be subjected to double-side printing as well as single-side printing.

When UV rays are applied to each of the color inks for every printing process, the color inks are satisfactorily cured. In order to achieve high-speed printing, the UV light sources 4a, 4b and 4c may be lowered in output power or may be omitted, so that the UV light source 4d is made to apply a sufficient dose of UV rays to a composite printed image formed of a plurality of colors. In addition, for realizing energy saving and cost reduction, LED light sources, which have recently been used practically for printing of photopolymerizable inks, may be used instead of conventionally used light sources such as high-pressure mercury lamps and metal halide lamps.

In FIG. 3, reference numeral 5 denotes a processing unit and reference numeral 6 denotes a wind-up roll for printed products.

EXAMPLES

The present invention will next be described by way of Examples, which should not be construed as limiting the present invention thereto.

Examples 1 to 17

The following materials (A) to (C) were mixed together in the amounts of the corresponding columns of Examples shown in Table 3, to thereby obtain inks. In Table 3, the units of the amounts of the materials (A) to (C) are part(s) by mass.
(A) (Meth)acrylic acid ester and/or (meth)acrylamide, each of which being negative for skin sensitization
(B) Triethylene glycol divinyl ether, t-butyl methacrylate, n-pentyl methacrylate and/or n-hexyl methacrylate, each of which being negative for skin sensitization
(C) Photoradical polymerization initiator negative for skin sensitization A1 to A14, B1 to B4, and C1 to C4 shown in Table 3 are as follows. The value in parentheses after each product name is "SI value" as measured by the LLNA test described in the above (1). The description "negative" or "none" after each product name means that the product is evaluated as "negative for skin sensitization" or "no skin sensitization" in the MSDS (Material Safety Data Sheet) described in the above (2) or the literature described in the above (3).

The calculation method of the SI value will be described below in detail.
A1: Caprolactone-modified dipentaerythritol hexaacrylate
"DPCA-60" ("negative" evaluated in MSDS), product of NIPPON KAYAKU Co. Ltd.
(test method: OECD test guideline 406)
A2: Polyethoxylated tetramethylolmethane tetraacrylate
"ATM-35E" (1.7), product of Shin-Nakamura Chemical Co., Ltd.
A3: Ethylene oxide-modified bisphenol A diacrylate
"BPE-10" (1.2), product of DAI-ICHI KOGYO SEI-YAKU CO., LTD.
A4: Caprolactone-modified neopentylglycol hydroxypivalate diacrylate
"HX-620" (0.9), product of NIPPON KAYAKU Co. Ltd.
A5: Hydroxyethylacryl amide
"HEAA" ("none"), product of KOHJIN Co., Ltd.
(test method: OECD test guideline 429)
A6: Polypropylene glycol diacrylate "M-270" (1.5), product of Toagosei Chemical CO., LTD.
A7: Tricyclodecanedimethanol dimethacrylate
"DCP" (1.3), product of Shin-Nakamura Chemical Co., Ltd.

A8: Polyethylene glycol dimethacrylate represented by Formula (1) (n is 14)
"LIGHT ESTER 14EG" (1.6), product of KYOEISHA CHEMICAL CO., LTD.
A9: Polyethylene glycol dimethacrylate represented by Formula (1) (n is 9)
"LIGHT ESTER 9EG" (1.3), product of KYOEISHA CHEMICAL CO., LTD.
A10: Trimethylolpropane trimethacrylate
"SR350" (1.9), product of Sartomer Co.
A11: γ-Butyrolactone methacrylate
"GBLMA" (2.1), product of OSAKA ORGANIC CHEMICAL INDUSTRY, LTD.
A12: Stearyl acrylate
"STA" (2.7), product of OSAKA ORGANIC CHEMICAL INDUSTRY, LTD.
A13: Neopentyl glycol dimethacrylate
"NPG" (2.0), product of Shin-Nakamura Chemical Co., Ltd.
A14: 1,4-Butanediol dimethacrylate
"SR214" (2.6), product of Sartomer Co.
B1: Triethylene glycol divinyl ether ("negative" evaluated in the MSDS)
(test method: OECD test guideline 406), product of BASF Co.
B2: t-Butyl methacrylate
"LIGHT ESTER TB" ("negative" evaluated in the literature), (test method: the maximization method), product of KYOEISHA CHEMICAL CO., LTD.
B3: n-Pentyl methacrylate
"n-AMYL METHACRYLATE" ("negative" evaluated in the literature), (test method: the maximization method), product of Toyo Science Corp.
B4: n-Hexyl methacrylate
"HEXYL METHACRYLATE" ("negative" evaluated in the literature), (test method: the maximization method), product of TOKYO CHEMICAL INDUSTRY CO., LTD.
C1: 2-Dimethylamino-2-(4-methylbenzyl)-1-(4-morpholin-4-yl-phenyl) butan-1-one ("none" evaluated in the MSDS) (test method: OECD test guideline 406)
C2: 2-Methyl-1-[4-(methylthio)phenyl]-2-morpholinopropan-1-one ("none" evaluated in the MSDS) (test method: OECD test guideline 406)
C3: 2-Benzyl-2-dimethylamino-1-(4-morpholinophenyl)butanone-1 ("none" evaluated in the MSDS) (test method: OECD test guideline 406)
C4: Equimolar mixture of 2,4-Diethylthioxanthone (1.4) and 2-ethylhexyl p-dimethylaminobenzoate ("none" evaluated in the MSDS) (test method: OECD test guideline 406)

<A Measuring Method for the SI Value>

According to the skin sensitization test based on the LLNA (Local Lymph Node Assay), the SI value was measured in the below described manner.
[Test Materials]
<Positive Control>
α-Hexylcinnamaldehyde (HCA; product of Wako Pure Chemical Industries, Ltd.) was used as the positive control.
<Vehicle>
The vehicle used was a mixture containing the below-listed acetone and olive oil in a ratio by volume of 4:1.
Acetone (product of Wako Pure Chemical Industries, Ltd.)
Olive oil (product Fudimi Pharmaceutical Co., Ltd.)
<Animals Used>
Before treated with the test substances, the positive control or the vehicle control, female mice were acclimated for 8 days including 6-day quarantine. No abnormalities were found in all the animals during the quarantine/acclimation period. Based on the body weights measured 2 days before the initiation of sensitization, they were categorized into 2 groups (4 mice/group) by the body weight stratified random sampling method so that the body weight of each individual was within ±20% of the average body weight of all the individuals. Each animal was 8 weeks old to 9 weeks old at the time of the initiation of sensitization. The animals remaining after the categorization were excluded from the test.

The animals were individually identified by application of oil ink to their tale throughout the test period, and also their cages were labeled for identification.

<Housing Environment>

Throughout the housing period including the quarantine/acclimation period, the animals were housed in an animal room with barrier system, which was set as follows: 21° C. to 25° C. in temperature, 40% to 70% in relative humidity, 10 times/hour to 15 times/hour in frequency of air circulation, and 12 hours in lighting cycle (lighting from 7:00 to 19:00). The housing cages used were those made of polycarbonate, and four animals were housed in each cage.

The animals were given ad libitum solid diet for laboratory animals MF (product of Oriental Yeast Co., Ltd.). Also, using a water-supply bottle, they were given ad libitum tap water in which sodium hypochlorite (PURELOX, product of OYALOX Co., Ltd.) had been added so that the chlorine concentration was about 5 ppm. Bedding used was SUN-FLAKE (fir tree, shavings obtained with a power planer) (product of Charles River Inc.). The diet and feeding equipment were sterilized with an autoclave (121° C., 30 min) before use.

The cage and bedding were replaced with new ones at the times of the categorization and the removal of the auricular lymph node (i.e., the time when the animals were transferred from the animal room), and the water-supply bottle and rack were replaced with new ones at the time of the categorization.

[A Test Method]

<Group Composition>

The group composition used for the measurement of the SI value is shown in Table 1.

TABLE 1

| Test group | Sensitization substance | Sensitization dose (µL/auricle) | Times of sensitization | Number of animals (animal No.) |
|---|---|---|---|---|
| Vehicle control group | Vehicle only | 25 | Once/day × 3 days | 4 (1-4) |
| Positive control group | 25.0% HCA | 25 | Once/day × 3 days | 4 (5-8) |

[Preparation]

<Test Substance>

Table 2 shows the amount of the test substance. The test substance was weighed in a measuring flask, and the volume of the test substance was adjusted to 1 mL with a vehicle. The thus-prepared solution was placed in a light-shielded airtight container (made of glass).

TABLE 2

|  | Concentration after adjustment (w/v %) | Mass of test substance (g) |
|---|---|---|
| Test substance | 50.0 | 0.5 |

<Positive Control>

0.25 g of HCA was accurately weighed, and a vehicle was added to the HCA to have the volume of 1 mL, to thereby prepare a 25.0 w/v % solution. The thus-prepared solution was placed in a light-shielded airtight container (made of glass).

<BrdU>

200 mg of 5-bromo-2'-deoxyuridine (BrdU, product of NACALAI TESQUE, INC.) was accurately weighed in a measuring flask. Then, physiological saline (product of OTSUKA PHARMACEUTICAL CO., LTD.) was added to the measuring flask, and dissolved through application of ultrasonic waves. The volume of the resultant solution was adjusted to 20 mL to prepare a 10 mg/mL solution (BrdU preparation). The thus-prepared solution was sterilized through filtration with a sterilized filtration filter and placed in a sterilized container.

<Preparation Day and Storage Period>

The positive control preparation was prepared on the day before the initiation of sensitization, and stored in a cold place except in use. The vehicle and the test substance preparations were prepared on the day of sensitization. The BrdU solution was prepared 2 days before administration and stored in a cold place until the day of administration.

[Sensitization and Administration of BrdU]

<Sensitization>

Each (25 µL) of the test substance preparations, the positive control preparation and the vehicle was applied to both the auricles of each animal using a micropipetter. This treatment was performed once a day for three consecutive days.

<Administration of BrdU>

About 48 hours after the final sensitization, the BrdU preparation (0.5 mL) was intraperitoneally administered once to each animal.

[Observation and Examination]

<General Conditions>

All the animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.

<Measurement of Body Weights>

The body weight of each animal was measured on the day of the initiation of sensitization and on the day of the removal of the auricular lymph node (i.e., the day when the animals were transferred from the animal room). Also, the average of the body weights and the standard error thereof were calculated for each group.

<Removal of the Auricular Lymph Node and Measurement of the Mass Thereof>

About 24 hours after the administration of BrdU, the animals were allowed to undergo euthanasia, and their auricular lymph nodes were sampled. The surrounding tissue of each auricular lymph node was removed, and the auricular lymph nodes from both the auricles were weighed at one time. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

<Measurement of BrdU Intake>

After returned to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

[Evaluation of Results]
<Calculation of Stimulation Index (SI)>

As shown in the following formula, the measurement of BrdU intake for each individual was divided by the average of the measurements of BrdU intake in the vehicle control group to calculate the SI value for the individual. The SI value of each test group was the average of the SI values of the individuals. Also, the standard error of the SI values was calculated for each test group. Notably, the SI value was rounded at the second decimal place and shown to the first decimal place.

$$SI = \frac{\text{Average of measurements of } BrdU \text{ intake for each individual(average of 3 wells)}}{\text{Average of measurements of } BrdU \text{ intake in the vehicle control group(average of 4 animals)}}$$

Each of the above-prepared inks was measured for viscosities (mPa·s) at 25° C. and 60° C., and light dose required for curing (mJ/cm$^2$). The results are shown in Table 3.

The viscosities at 25° C. and 60° C. were measured with a cone-plate-type rotary viscometer (product of TOKI SANGYO CO., LTD.) with the temperature of circulating water being constantly set to 25° C. and 60° C. The temperature of 25° C. is a temperature generally considered room temperature. The temperature of 60° C. is a temperature set considering the specification of a commercially available inkjet ejection head able to be heated, such as GEN4 (product of Ricoh Printing Systems, Ltd.).

The curing property of the inks was evaluated as follows. Specifically, each ink was jetted on a commercially available polyethylene terephthalate (PET) film (product name: COSMOSHINE A4300, product of TOYOBO CO., LTD.) and irradiated with light using a UV irradiating device LH6 (product of Fusion Systems Japan Co., Ltd.).

An aluminum pouch bag having a shape illustrated in FIG. 1 was charged with the ink, and hermetically sealed so as to avoid inclusion of air bubbles. The hermetically sealed pouch bag containing the ink was housed in a plastic cartridge as illustrated in FIG. 2. This cartridge was mounted to a casing adapted for housing it. In the casing, an ink flow channel was provided from the cartridge to a GEN4 head (product of Ricoh Printing Systems, Ltd.). The ink was jetted through the ink flow channel to form, on the film, a solid coated film (i.e., a uniformly and entirely coated film) having a thickness of about 10 μm and a size of 2.5 cm×2.5 cm.

The thus-formed solid coated film was irradiated with light of the wavelength region corresponding to the UVA region, with the light dose being changed stepwise to 1,000, 500, 200, 100, 50, 20 and 10 (mJ/cm$^2$). Whether the solid coated film turned into the non-sticky state was judged by touching it with a finger, and the solid coated film was judged as being cured when it turned into the non-sticky state. The minimum integrated light dose required that the solid coated film was judged as being cured is shown as the light dose required for curing in Table 3. The inks that require less integrated light dose have better curing property.

Notably, the physical properties of the ink preferably comply with the requirement specification of the inkjet ejection head used. Many manufacturers put various ejection heads on the market. Some of them have a function of adjusting the temperature over a wide range. In view of this, the viscosity of the ink is preferably 2 mPa·s to 150 mPa·s at 25° C. Considering ejecting the ink at 25° C., the viscosity thereof is more preferably 5 mPa·s to 18 mPa·s. However, even when the viscosity of the ink at 25° C. is too high, the aforementioned temperature-adjusting function of the ejection head can optionally be used to heat the head so that the ink is reduced in viscosity. When the heating temperature is 60° C., the viscosity of the ink at 60° C. is preferably 2 mPa·s to 20 mPa·s, more preferably 5 mPa·s to 18 mPa·s.

The light dose required for curing is preferably lower in terms of energy saving. However, the ink that is cured with a considerably low level of light irradiation will be cured through reaction with room light or leak light from the curing light source through the gas-liquid interface of the jetting nozzle of the ejection head, causing concerns that nozzle clogging occurs. This problem can be solved by appropriately designing a printer in many cases, but much better curing property of inks is not preferred. Considering this, the light dose required for curing the inks is preferably 5 mJ/cm$^2$ to 10,000 mJ/cm$^2$, more preferably 10 mJ/cm$^2$ to 1,000 mJ/cm$^2$, still more preferably 10 mJ/cm$^2$ to 200 mJ/cm$^2$.

TABLE 3

| | Material | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| A | A1 | 20 | 20 | 20 | 20 | 20 | 20 | 20 | 20 | 20 |
| | A2 | | | | | | | | | |
| | A3 | 20 | 10 | 10 | 10 | 10 | 10 | 10 | 20 | 15 |
| | A4 | 10 | 10 | 10 | 10 | 10 | 10 | 10 | | |
| | A5 | | | | | | | | | 5 |
| | A6 | 10 | 10 | 10 | 10 | 10 | 10 | 10 | | |
| | A7 | | | | | | | | | |
| | A8 | | | | | | | | | |
| | A9 | | | | | | | | | |
| | A10 | | | | | | | | | |
| | A11 | | | | | | | | | |
| | A12 | | | | | | | | | |
| | A13 | | | | | | | | | |
| | A14 | | | | | | | | | |

TABLE 3-continued

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| B | B1 | 50 | | | | | | | 10 | 10 |
| | B2 | | 50 | 50 | 50 | 50 | | | 40 | 50 |
| | B3 | | | | | | 50 | | 5 | |
| | B4 | | | | | | | 50 | 5 | |
| C | C1 | 10 | 5 | | | | 5 | 5 | 5 | 5 |
| | C2 | | | 5 | | | | | | |
| | C3 | | | | 5 | | | | | |
| | C4 | | | | | 5 | | | | |
| Carbon black* | | | | | | | | | | |
| Viscosity at 25° C. (mPa·s) | | 39 | 8 | 8 | 8 | 7 | 9 | 10 | 9 | 8 |
| Viscosity at 60° C. (mPa·s) | | 10 | 2 | 2 | 2 | 2 | 3 | 4 | 3 | 3 |
| Ejection temp. of head | | 60° C. | 25° C. | 25° C. | 25° C. | 25° C. | 25° C. | 25° C. | 25° C. | 25° C. |
| Light dose required for curing (mJ/cm²) | | 200 | 10 | 20 | 10 | 50 | 50 | 100 | 20 | 20 |

| | Material | Ex. 10 | Ex. 11 | Ex. 12 | Ex. 13 | Ex. 14 | Ex. 15 | Ex. 16 | Ex. 17 |
|---|---|---|---|---|---|---|---|---|---|
| A | A1 | 20 | 20 | | | | 20 | 20 | |
| | A2 | | | 49 | | | | | |
| | A3 | 18 | 13 | | | | 20 | 10 | |
| | A4 | | | | | | | | |
| | A5 | | 5 | | | 2 | | | |
| | A6 | | | | | | 10 | 10 | |
| | A7 | | | | 25 | 25 | | | 25 |
| | A8 | | | | 1 | | | | 1 |
| | A9 | 2 | 2 | | 1 | | | | 1 |
| | A10 | | | | 25 | 25 | | | 25 |
| | A11 | | | | 3 | | | | 3 |
| | A12 | | | 1 | | | | | |
| | A13 | | | | 2 | 4 | | | 2 |
| | A14 | | | | 3 | 4 | | | 3 |
| B | B1 | 10 | 10 | 50 | | | 50 | | |
| | B2 | 50 | 50 | | 40 | 40 | | 50 | 40 |
| | B3 | | | | | | | | |
| | B4 | | | | | | | | |
| C | C1 | 5 | 10 | 10 | 20 | 20 | 10 | 5 | 20 |
| | C2 | | | | | | | | |
| | C3 | | | | | | | | |
| | C4 | | | | | | | | |
| Carbon black* | | | | | | | 4 | 4 | 4 |
| Viscosity at 25° C. (mPa·s) | | 8 | 8 | 40 | 11 | 11 | 50 | 11 | 15 |
| Viscosity at 60° C. (mPa·s) | | 3 | 3 | 11 | 3 | 3 | 14 | 4 | 6 |
| Ejection temp. of head | | 25° C. | 25° C. | 60° C. | 25° C. | 25° C. | 60° C. | 25° C. | 25° C. |
| Light dose required for curing (mJ/cm²) | | 20 | 20 | 200 | 200 | 200 | 500 | 20 | 500 |

*Carbon black #10 (product of Mitsubishi Chemical Corporation) which is in the form of a mixture with polymer dispersing agent S32000 (product of Lubrizol Japan Co.) with the ratio by mass of S32000:Carbon black #10 being 3:1. The above amount of carbon black is that of Carbon black #10 in the mixture.

From comparison among Examples 1, 2, 6, 7 and 8, using different low-viscosity ingredients or using low-viscosity ingredients in combination, it was confirmed that all the inks in these Examples could be jetted without any problems by adjusting the head to a suitable temperature and that the obtained solid coated films could be cured through light irradiation.

The ink in Example 2 is superior to the other inks in terms of being low viscosity and improved curing property. The ink to be used may appropriately be selected from them depending on the properties required for the intended image quality and image surface property as well as various requirements such as the process cost and the compatibility with the printing process of the printer used.

From comparison among Examples 2, 3, 4 and 5 using different polymerization initiators, the ink of Example 2 is superior to the other inks in terms of curing property; however, similarly, the ink to be used may appropriately be selected from them depending on the various requirements as described above.

From comparison among Example 9 using the acrylate and the methacrylate in combination, Example 10 using the acrylate and the acrylamide in combination, and Example 11 using the acrylate, the methacrylate and the acrylamide in combination, all of these inks can exhibit sufficiently low viscosity and high curing property; however, similarly, the ink to be used may appropriately be selected from them depending on the various requirements as described above.

From comparison between Examples 1 and 12 using different acrylates, both of the inks can exhibit almost the same viscosity and curing property; however, similarly, the ink to be used may appropriately be selected from them depending on the various requirements as described above.

The inks of Examples 13 and 14 using no acrylate can be jetted without any problems similar to those of the other Examples, and the obtained solid coated films could be cured through light irradiation. The ink to be used may appropriately be selected from them depending on the various requirements as described above.

The inks of Examples 15, 16 and 17 containing a colorant could be jetted by adjusting the head to a suitable temperature, and the obtained solid coated films could be cured through light irradiation.

Aspects of the present invention are as follows.

<1> A photopolymerizable inkjet ink including:
at least one selected from the group consisting of (meth) acrylic acid esters negative for skin sensitization and (meth) acrylamides negative for skin sensitization; and
at least one selected from the group consisting of vinyl ethers negative for skin sensitization, t-butyl methacrylate negative for skin sensitization, n-pentyl methacrylate negative for skin sensitization, and n-hexyl methacrylate negative for skin sensitization.

<2> The photopolymerizable inkjet ink according to <1>, wherein the at least one selected from the group consisting of (meth)acrylic acid esters negative for skin sensitization and (meth)acrylamides negative for skin sensitization is at least one selected from the group consisting of polyethylene glycol dimethacrylates represented by the following General Formula (1), γ-butyrolactone methacrylate, trimethylolpropane trimethacrylate, tricyclodecanedimethanol dimethacrylate, caprolactone-modified dipentaerythritol hexaacrylate, polypropylene glycol diacrylate [$CH_2$=CH—CO—($OC_3H_6$)$_n$—OCOCH=$CH_2$ (n is 12) where n is an average degree of polymerization], diacrylates of caprolactone-modified neopentylglycol hydroxypivalate, polyethoxylated tetramethylol methane tetraacrylate, ethylene oxide-modified bisphenol A diacrylate, neopentyl glycol dimethacrylate, hydroxyethyl acrylamide and stearyl acrylate:

(1)

where n is an integer of 9 to 14 where n is an average degree of polymerization.

<3> The photopolymerizable inkjet ink according to <1> or <2>, wherein the vinyl ether negative for skin sensitization is triethylene glycol divinyl ether.

<4> The photopolymerizable inkjet ink according to any one of <1> to <3>, further including a photoradical polymerization initiator.

<5> The photopolymerizable inkjet ink according to <4>, wherein the photoradical polymerization initiator is negative for skin sensitization.

<6> An ink cartridge including:
the photopolymerizable inkjet ink according to any one of <1> to <5>; and
a container, which houses the photopolymerizable inkjet ink.

<7> An inkjet recording device including:
the ink cartridge according to <6>; and
an ink jetting unit configured to apply a stimulus to the photopolymerizable inkjet ink to make the photopolymerizable inkjet ink jet, to thereby form an image.

REFERENCE SIGNS LIST

1: Base material feed roller
2: Base material to be printed
3: Printing unit
3a: Printing unit for a color ink
3b: Printing unit for a color ink
3c: Printing unit for a color ink
3d: Printing unit for a color ink
4a: UV light source
4b: UV light source
4c: UV light source
4d: UV light source
5: Processing unit
6: Wind-up roll for printed products
200: Ink cartridge
241: Ink bag
242: Ink inlet
243: Ink outlet
244: Cartridge case

The invention claimed is:

1. A photopolymerizable inkjet ink comprising:
at least one selected from the group consisting of a (meth)acrylic acid ester negative for skin sensitization and a (meth)acrylamide negative for skin sensitization; and
at least one selected from the group consisting of a vinyl ether negative for skin sensitization, t-butyl methacrylate negative for skin sensitization, n-pentyl methacrylate negative for skin sensitization, and n-hexyl methacrylate negative for skin sensitization.

2. The inkjet ink according to claim 1, wherein the vinyl ether negative for skin sensitization is triethylene glycol divinyl ether.

3. The inkjet ink according to claim 1, further comprising a photoradical polymerization initiator.

4. The inkjet ink according to claim 3, wherein the photoradical polymerization initiator is negative for skin sensitization.

5. An ink cartridge comprising:
a photopolymerizable inkjet ink; and
a container, which houses the photopolymerizable inkjet ink,
wherein the photopolymerizable inkjet ink comprises:
at least one selected from the group consisting of a (meth)acrylic acid ester negative for skin sensitization and a (meth)acrylamide negative for skin sensitization; and
at least one selected from the group consisting of a vinyl ether negative for skin sensitization, t-butyl methacrylate negative for skin sensitization, n-pentyl methacrylate negative for skin sensitization, and n-hexyl methacrylate negative for skin sensitization.

6. An inkjet recording device comprising:
an ink cartridge; and
an ink jetting unit configured to apply a stimulus to a photopolymerizable inkjet ink to make the photopolymerizable inkjet ink jet, to thereby form an image,
wherein the ink cartridge comprises:
a photopolymerizable inkjet ink; and
a container, which houses the photopolymerizable inkjet ink,
wherein the photopolymerizable inkjet ink comprises:
at least one selected from the group consisting of a (meth)acrylic acid ester negative for skin sensitization and a (meth)acrylamide negative for skin sensitization; and
at least one selected from the group consisting of a vinyl ether negative for skin sensitization, t-butyl methacrylate negative for skin sensitization, n-pentyl methacrylate negative for skin sensitization, and n-hexyl methacrylate negative for skin sensitization.

7. A photopolymerizable inkjet ink comprising:
at least one selected from the group consisting of a (meth)acrylic acid ester negative for skin sensitization and a (meth)acrylamide negative for skin sensitization; and
at least one selected from the group consisting of a vinyl ether negative for skin sensitization, t-butyl methacrylate negative for skin sensitization, n-pentyl methacrylate negative for skin sensitization, and n-hexyl methacrylate negative for skin sensitization,
wherein the (meth)acrylic acid ester negative for skin sensitization and the (meth)acrylamide negative for skin sensitization is at least one selected from the group consisting of a polyethylene glycol dimethacrylate of Formula (1):

(1)

wherein n is an integer of from 9 to 14 and is an average degree of polymerization, γ-butyrolactone methacrylate, trimethylolpropane trimethacrylate, tricyclodecanedimethanol dimethacrylate, caprolactone-modified dipentaerythritol hexaacrylate, polypropylene glycol diacrylate, $CH_2=CH-CO-(OC_3H_6)_n-OCOCH=CH_2$ wherein n is 12 and is an average degree of polymerization, a diacrylate of caprolactone-modified neopentylglycol hydroxypivalate, polyethoxylated tetramethylol methane tetraacrylate, ethylene oxide-modified bisphenol A diacrylate, neopentyl glycol dimethacrylate, hydroxyethyl acrylamide and stearyl acrylate.

8. The photopolymerizable inkjet ink according to claim 7, wherein the vinyl ether negative for skin sensitization is triethylene glycol divinyl ether.

9. The photopolymerizable inkjet ink according to claim 7, further comprising a photoradical polymerization initiator.

10. The photopolymerizable inkjet ink according to claim 9, wherein the photoradical polymerization initiator is negative for skin sensitization.

11. An ink cartridge comprising:
a photopolymerizable inkjet ink according to claim 7; and
a container, which houses the photopolymerizable inkjet ink.

12. A photopolymerizable composition comprising:
at least one member selected from the group consisting of (meth)acrylic acid esters negative for skin sensitization and (meth)acrylamides negative for skin sensititzation; and
at least one member selected from the group consisting of vinyl ethers negative for skin sensitization, t-butyl methacrylate negative for skin sensitization, n-pentyl methacrylate negative for skin sensitization, and n-hexyl methacrylate negative for skin sensitization.

13. A photopolymerizable ink comprising:
at least one member selected from the group consisting of (meth)acrylic acid esters negative for skin sensitization and (meth)acrylamides negative for skin sensititzation; and
at least one member selected from the group consisting of vinyl ethers negative for skin sensitization, t-butyl methacrylate negative for skin sensitization, n-pentyl methacrylate negative for skin sensitization, and n-hexyl methacrylate negative for skin sensitization.

14. An inkjet recording device comprising:
an ink cartridge; and
an ink jetting unit configured to apply a stimulus to a photopolymerizable inkjet ink to make the photopolymerizable inkjet ink jet, to thereby form an image,
wherein the ink cartridge comprises:
a photopolymerizable inkjet ink according to claim 7; and
a container, which houses the photopolymerizable inkjet ink.

* * * * *